United States Patent [19]

Wiesemann

[11] Patent Number: 4,597,864
[45] Date of Patent: Jul. 1, 1986

[54] WASTE MATERIALS FILTERING APPARATUS

[76] Inventor: Bruce O. Wiesemann, 7027 Sunset Dr. South, South Pasadena, Fla. 33707

[21] Appl. No.: 737,886

[22] Filed: May 28, 1985

[51] Int. Cl.⁴ .............................................. B01D 33/32
[52] U.S. Cl. .................................. 210/160; 198/681; 210/400; 210/401; 210/408; 210/526
[58] Field of Search ............... 210/153, 154, 156, 158, 210/159, 160, 328–330, 400, 401, 526, 391, 407, 408; 198/681, 713, 714

[56] References Cited

U.S. PATENT DOCUMENTS 3,856,678 12/1974 Hagihara .............................. 210/160
4,188,294 2/1980 Hagihara .............................. 210/160

Primary Examiner—Frank Sever
Attorney, Agent, or Firm—Ronald E. Smith; Miguel A. Valdes

[57] ABSTRACT

An apparatus for continuously removing waste materials from a water stream. The apparatus includes a rotating screen assembly formed by a plurality of articulated "L"-shaped links that form separate, laterally spaced closed loops. The space between the loops of links defines the maximum size of material that can pass through the apparatus without being removed from the stream. The respective truncate portions of the "L"-shaped links facilitate the lifting of the debris from the stream. The screen assembly is rotated by motor-driven sprocket segments that are positioned at the discharge end of the apparatus. These segments substantially occupy the spaces between the links when the links travel past the segments, and the occupation of the spaces by the segments displaces the waste materials from the spaces and dislodges the materials from the links as well so that the materials may fall under the influence of gravity to a receptacle. A blocking shoe and a protective shoe are among the important features of the apparatus; the blocking shoe prevents waste materials from flowing under the apparatus, and the protective shoe prevents materials from protruding into the interior of the screen assembly.

14 Claims, 4 Drawing Figures

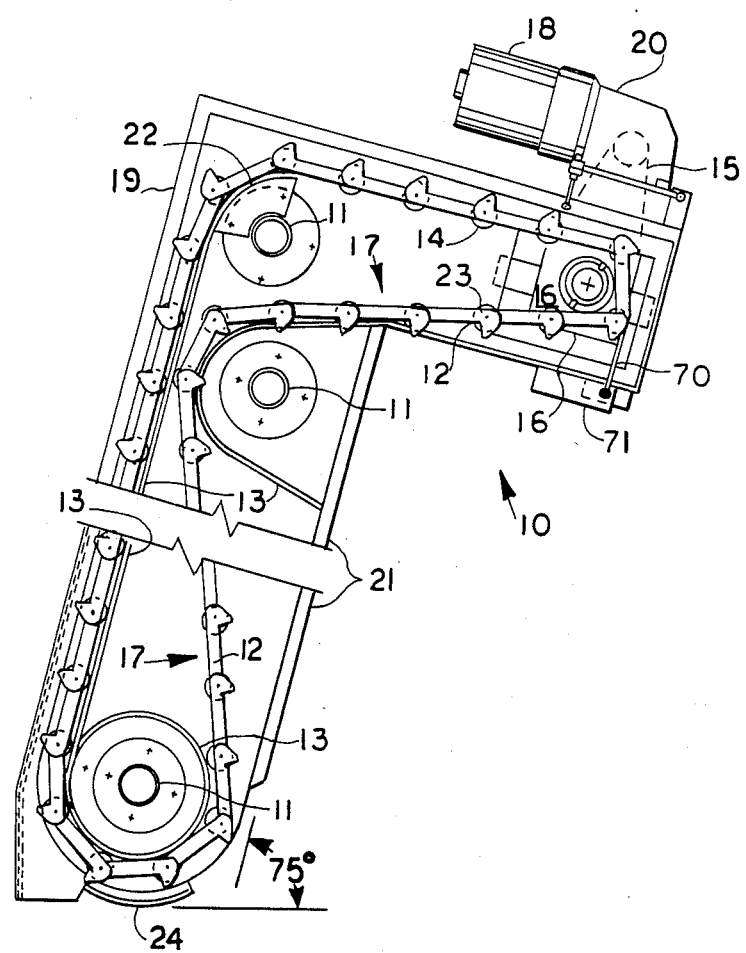
FIG_1

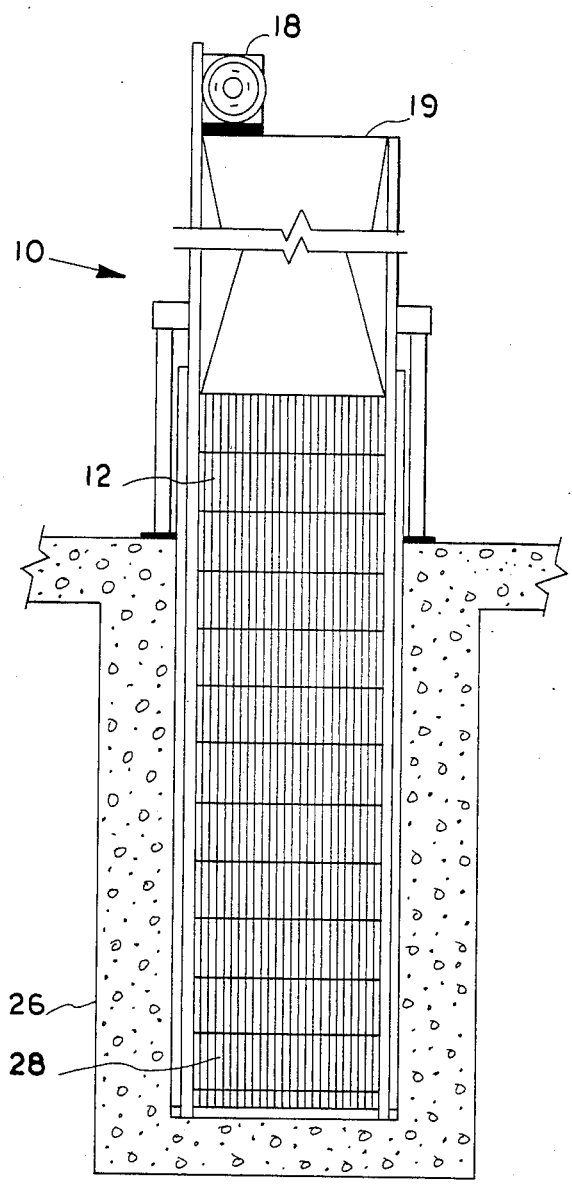
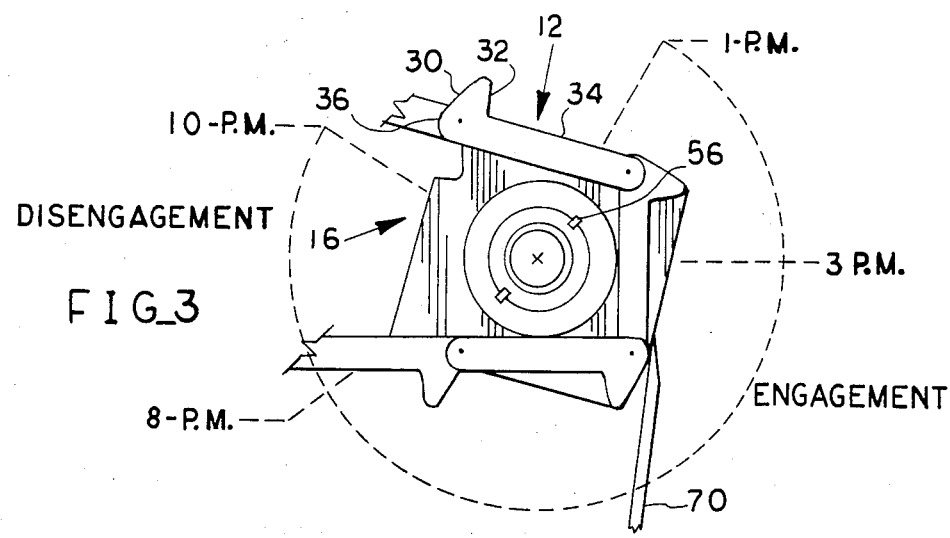

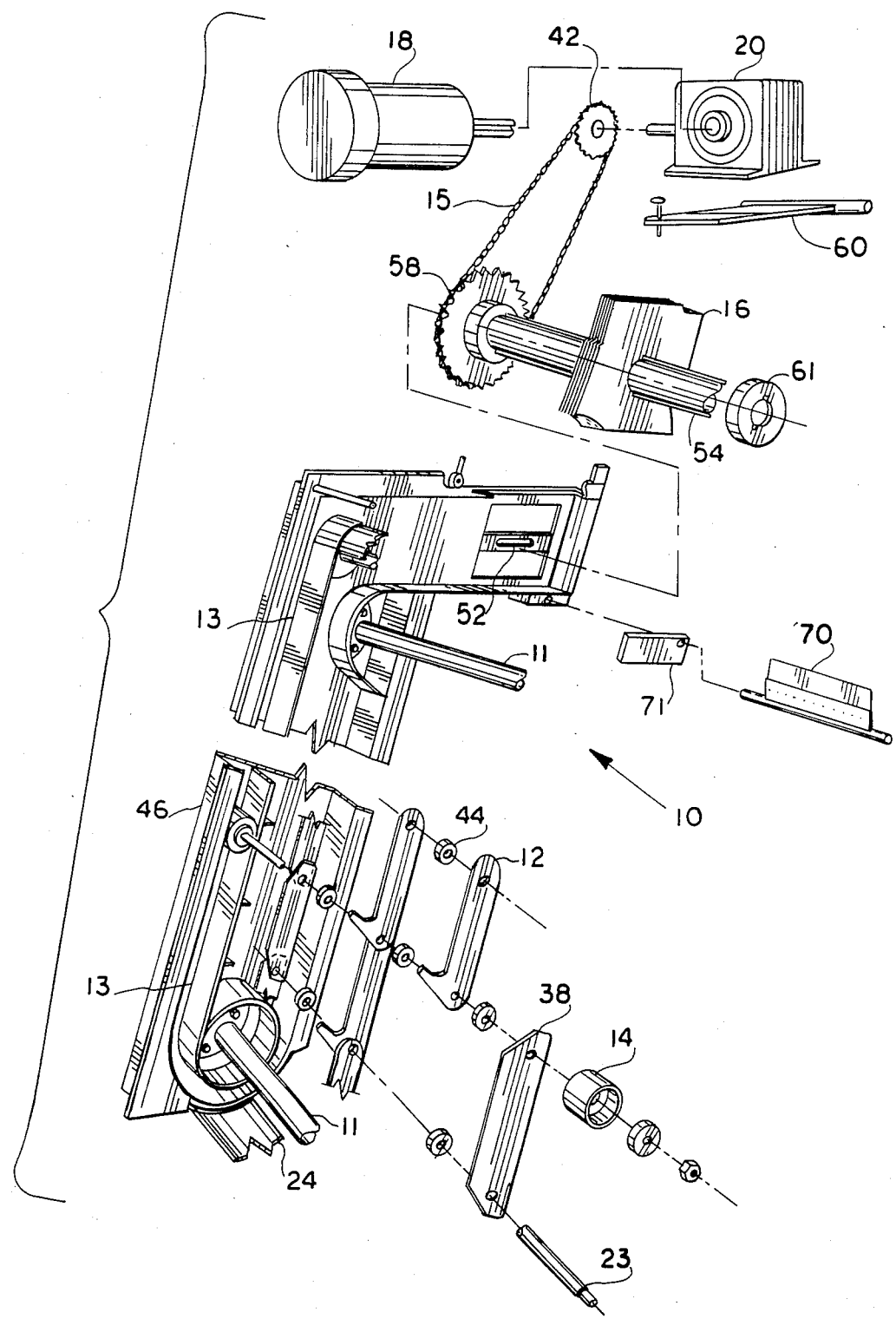
FIG_4

WASTE MATERIALS FILTERING APPARATUS

BACKGROUND OF THE INVENTION

1. Field of the Invention

This invention relates to filtering and screening devices, and more particularly relates to an apparatus for screening waste materials from a water stream.

2. Description of the Prior Art

Several prior art apparatus operable to filter and screen waste materials have been disclosed in a number of U.S. patents throughout the years. An endless screen for screening water in gate-houses of waterworks systems in which the screen may be shifted to a fresh portion by a single person is described in U.S. Pat. No. 658,196 to Whitney (1900).

An apparatus comprising a rotary screen in the form of an endless screening apron, supported upon two drums and having a series of projections to engage and lift the rubbish to the surface of the water, is disclosed in U.S. Pat. No. 677,567 to Freeman (1901).

A screen structure to arrest and remove any collection of sticks, leaves or the like in a water supply in such a manner as to prevent the screen from becoming clogged is disclosed in U.S. Pat. No. 1,207,376 to Davidson (1916). This structure comprises a screen frame, shafts journaled at the upper and lower ends of said frame and an endless screen member arranged to operate over said shafts.

A combined fish-screen and debris-remover which comprises a series of members arranged in an endless chain and means for moving said members orbitally in a vertical plane is described in U.S. Pat. No. 1,252,617 to Requa (1918).

A flume screen that reduces the leakage of the unscreened liquid past the submerged ends of the screen is disclosed in U.S. Pat. No. 1,514,673 to Roddy (1924). This screen of an endless, traveling type comprises screen sections and sprocket chains to which the ends of the screen sections are secured, the combination with the submerged end of the screen and the means that cause it to make the lower turn, of means arranged to cover the lateral edges of the screen and the chains to restrict the flow of unscreened water around the side edges of the screen, and guards inside the restricting means arranged close to and opposite the outer edges of the supporting chains arranged to restrict the passage of the unfiltered water that may escape around the edges of the screen through the chains.

A screening and filtering apparatus, described in U.S. Pat. No. 1,967,050 to Brackett (1934), discloses perforated or mesh plates made in sections and secured together by terminal flanges forming stiffening bars projecting on one side and running transversely across the plates. The plates may be secured to the side chains by angle pieces bolted to the plates and to the links.

An apparatus for cleaning bar grids, as described in U.S. Pat. No. 3,856,216 to Teague et. al. (1974), discloses an automatic rake provided with a plurality of fingers extending between the bars of the grid so that the material from the grid will be raked into the path of a disintegrator to be pulverized therein.

A rotary filter apparatus having an endless belt composed of many linking rods, linking plates, wire ropes or screen plates, and specially-shaped filter plates rockably fitted on the transverse linking rods, is disclosed in U.S. Pat. No. 4,188,294 to Hagihara (1980).

Filter and screening devices in the art today encounter many operational difficulties because of their shortcomings and limitations. For example, filtering devices for fine screening are susceptible to the blanking of the screen openings. This causes a water head increase upstream of the device location. Because of the sticky nature of the waste materials, other auxiliary devices are sometimes needed to dislodge the blanking material or to unplug the screen opening of such filtering devices. Examples of these auxiliary devices are water sprays, combing devices and rotating brushes. The use of such devices requires a significant increase of electrical power for their operation. Moreover, the effectiveness of these devices is considerably low.

Furthermore, some filtering and screening devices in the market provide for dual filtration. This is necessary since at the bottom end of these devices their filter elements require an open space for making the turn. This is an undesirable feature because larger and heavier waste materials tends to roll along the bottom of the flow stream channel and slip through the large open spaces located there.

Another difficulty with conventional filtering devices arises when materials to be screened protrudes through the screen openings. These materials cause damage to both the screening elements and the driving mechanism of such filtering devices.

There is a need for an apparatus that filters and screens waste materials from a water stream in an economical and effective way without the use of auxiliary devices for unplugging the screening openings and dislodging the materials therein.

It is therefore an object of this invention to provide a filtering apparatus that effectively cleans the screening elements during the filtering and screening action.

It is another object of this invention to provide a filtering apparatus that prevents the waste materials from bypassing the screening elements at the bottom end of the apparatus.

It is another object of this invention to provide a filtering apparatus that effectively dislodges the waste materials protruding through the screen openings, thereby preventing damage to the apparatus.

It is still another object of this invention to provide a filtering apparatus having a simple design with no drag chains, chain links, bearings, or sprockets subject to submersion.

SUMMARY OF THE INVENTION

This invention accomplishes these and other objects by providing a filtering and screening apparatus having a screen assembly with L-shaped links to lift the waste materials out of a stream of water. Continuous loops of these links are positioned in laterally spaced relation to one another, forming a screen that provides a filtration clearance smaller than the size of the waste materials. The screen assembly is driven continuously by sprocket segments disposed upwardly of the stream and disposed transversely to the direction of flow thereof. The sprocket segments, rotated by a driving means, are positioned at the upper end of the apparatus and engage the screen assembly between the links. These segments substantially occupy the spaces between the links so as to unload the waste materials and clean the space therebetween.

An important feature of this invention is a blocking shoe (plate) mounted on the bottom end of said apparatus to prevent large debris of waste materials from bypassing the screen assembly. This plate is bent to an arch-shape with an inside radius equal to the outside turning radius of the screen assembly plus the filtration clearance between the links. This blocking plate in combination with the screen assembly provides the same fineness of filtration throughout the screening and filtering cycle. For example, a screen having ¼" filtration clearance will filter out materials larger than ¼" in diameter even at the bottom end of the apparatus. Thus, there are no openings larger than ¼" exposed to the flow stream to be filtered.

Another important feature of this invention is a protective shoe (plate) mounted on the upper end of the filtering apparatus, which plate is operative to push back any waste materials that protrude through the link openings. These materials might otherwise enter into the space between the drive sprocket segments and cause some damage. This plate also is bent to an arch-shape and has an outside radius equal to the inside turning radius of the screen links. This protective plate also provides support to the screen assembly to prevent sagging or buckling.

Still another feature of this invention is the configuration of the screen assembly links. They are L-shaped links comprising a body portion and a tooth portion with a curved transition between such portions. The tooth portion also has a curved back surface. This configuration allows the complete cleaning of the screen links and eliminates interference with the drive sprocket segments as it disengages from the links.

Still another important feature of this invention is that the sproket segments and the driving means of the apparatus are positioned well behind the front of the screen assembly where the filtration takes place. This makes possible the complete removal of the waste materials from the water stream since a discharge area is created to place a trash receptacle or conveying device with no interference with the screen assembly. Consequently, there is no need for the recirculation of the waste materials back into the flow stream at the downstream side.

Additional features of this invention are a combination supporting protective device for trouble free driving and sprocket segment operation; a unique counter balanced screen design for reduced power consumption; a combination of critical angles of component mounting to allow for the proper timing of the sprocket engagement and disengagement in order to improve the screen cleaning; a design that enhances the ability to use various construction materials to meet various requirements; and the use of corrosion resistant materials for all parts moving into the water stream.

An advantage of this invention is that the screen assembly and the sprocket segments combine into a very effective mechanism that not only drives and unloads the waste materials outside the water stream but also dislodges the screenings from the screen openings thereby exposing clean openings to the water streams to be filtered. A further advantage of this invention is that the sprocket segment has a special configuration allowing it to fully protrude through both body and tooth portions of the links. This configuration enables a progressive engagement and disengagement of the segments and the links during the filtering function. The progressive disengagement exerts a wiping action of the sprocket segments against the screen links thereby improving the cleaning function of the segments.

This invention includes significant improvements over prior art devices. Mechanical devices such as water sprays, combs, or rotating brushes are not required to maintain the screen assembly free of blanking waste materials. Furthermore, the invention eliminates the need for drag chains, chain links, bearings and sprockets subject to submersion in water streams by using a simple screen assembly and driving means. All these improvements reduce the overall power consumption of a filtering and screening apparatus according to the invention.

Other objects, features and advantages of the present invention will become apparent to those of ordinary skill in the art upon examination of the following detailed description and the accompanying drawings showing a preferred embodiment of the invention.

BRIEF DESCRIPTION OF THE DRAWINGS

FIG. 1 is a partial side elevational, cross sectional view of a filtering and screening apparatus according to the invention;

FIG. 2 is a frontal view of a filtering and screening apparatus according to the invention, installed inside a water channel;

FIG. 3 is an enlarged partial cross sectional view of a sprocket segment and the engaged screen links according to the invention; and FIG. 4 is an exploded partial perspective view of a filtering and screening apparatus according to the invention.

DETAILED DESCRIPTION OF THE PREFERRED EMBODIMENT

Referring now to FIG. 1, there it will be seen that reference numeral 10 identifies an embodiment of a filtering and screening apparatus according to the invention. Apparatus 10 includes a screen assembly 17 having screen links 12, sprocket segments 16, a standard variable speed motor 18, a double reduction gear drive 20, a steel drive chain 15, guide rollers 14, pipe spreaders 11, a track assembly 13, a protective shoe 22, a blocking shoe 24, a front cover 19 and a back cover 21.

As is clear from an inspection of FIGS. 1 and 2, the screen assembly of the present invention is formed of a plurality of links 12 that are hingedly connected end to end to one another in articulated fashion as shown in FIG. 1 to form a continuous loop means. The individual loops of links 12 are then disposed in laterally spaced relation to one another as depicted in FIG. 2 to form the screen assembly. The spacing between laterally adjacent links determines the maximum size of waste items that can pass through the apparatus without being removed from the stream of water flowing through the channel in which the apparatus is positioned.

As is also clear from FIG. 1, the path of travel followed by the links of each screen assembly loop includes a return bend shown at the bottom of FIG. 1, an upwardly inclined portion tilted away from the stream flow, which portion is at the left side of FIG. 1, a generally horizontal but downwardly inclined portion wherein the links travel in the direction of the stream flow, upwardly thereof, an upper return bend portion, a generally horizontal portion wherein the links travel in a direction opposite to the stream flow, and a downwardly inclined portion that returns the links to the bottom return bend.

Sprocket segments 16 are also mounted in laterally spaced relation to one another and are rotatably mounted at the upper return bend of the screen assembly as shown in FIG. 1, and are positioned between the screen links 12, substantially occupying the space between such links, as the links travel through said upper return bend attendant motor-driven rotation of the screen assembly. The screen assembly 17 is driven by the motor-driven, rotating sprocket segments 16, which rotation moves the links 12 upward along the front side (the stream side) of the apparatus. During this movement, the waste materials are carried up and out of the water stream by the tooth portions of links 12 to be later unloaded or disengaged therefrom by sprocket segments 16 at the upper return bend. A trash receptacle, not shown, is disposed downwardly of said upper return bend to collect waste items disengaged from the links 12 by the action of the sprocket segments 16. It should be understood that the links 12 are generally "L"-shaped and have a truncate leg, or tooth portion, and an elongate portion that are interconnected by a gentle curve as shown in FIG. 3 and as will be discussed more fully hereinafter.

Guide rollers 14 guide the screen assembly 17 as it travels around the track assemblies which are collectively designated 13.

Apparatus 10 also includes a doctor blade assembly 70 for wiping from the links any waste material not removed by sprocket segments 16. A counterweight 71 is attached to assembly 70 so as to maintain the blade in continous wiping contact with sprocket segments 16.

Inside the water channel the frontal part of the apparatus 10 is installed in a tilted position with an inclination angle of 75 degrees from the horizontal. Other inclination angles may be used depending on the specific application. This inclination positions the sprocket segments 16 approximately 3½ feet behind the frontal part of apparatus 10, thereby creating a discharge area within which may be placed a trash receptacle as aforesaid or a conveying device. This allows for the complete removal of the waste materials from the screen assembly 17 without recirculation of the materials back into the flow stream on the downstream side.

Blocking shoe 24 consists of a ¼ inch thick stainless steel plate with a formed radius equal to the outside turning radius of the screen assembly 17 plus the filtration clearance between links 12. Shoe 24 has a preselected length so that as one link 12 passes out of the shoe area, the next link on the screen assembly 17 enters the shoe area. This prevents large waste materials from bypassing the apparatus 10 at the bottom end of the screen assembly 17. Shoe 24 is bolted to the framework of the apparatus and also serves as an overall width tie-in device.

The protective shoe 22 is made of a ¼ inch thick stainless steel plate and is bolted to the side framework. Shoe 22 serves also as a tie-in device and has an outside radius equal to the inside turning radius of the screen assembly 17. The purpose of shoe 22 is to force any materials that have protruded through the filtration clearance between links 12 back through the links for later discharge by the sprocket segments 16. Consequently, shoe 22 prevents the materials from entering into the internal space defined by the loops of links 12 so that interference with the sprocket segments is prevented.

Front cover 19 is attached to the frontal side of apparatus 10. The uncovered portion of this side exposes the screen assembly 17 to the water stream flow that carries the waste materials.

As shown in FIG. 2, apparatus 10 fits into the space of a water channel 26 in an upright position. The upper portion of apparatus 10 extends above the channel 26. The frontal side of this portion may be covered by front cover 19. The lower portion of apparatus 10 is positioned inside the water channel 26. FIG. 2 illustrates the filtration clearance 28 between links 12 and the position of motor 18 on the upper portion of apparatus 10.

FIG. 3 depicts a sprocket segment 16 and screen links 12 that engage segment 16. The unique configuration of segment 16 and links 12 permits both the driving and cleaning of the screen assembly 17. Link 12 features a curved transition 32 from the tooth portion 30 to the body portion 34 of link 12. An angular transition may increase the sticking of blanking material on links 12 and the plugging of the openings on the screen assembly 17. Link 12 also features a curved back surface 36 of the tooth portion 30. The configuration of sprocket segment 16 allows it to fully protrude through the body portion 34 and the tooth portion 30 of adjacent links 12. The engagement of the sprocket segment 16 and links 12 is progressive. It begins on the upstream end of link 12 at about the one o'clock position and continues toward full engagement when that link end reaches about the three o'clock position. Full engagement continues until about the eight o'clock position where the disengagement begins. The disengagement is also progressive and continues until about the ten o'clock position. This progressive disengagement creates a wiping action of the sprocket segment 16 against the screen links 12 further improving the cleaning function thereof. Sprocket segment 16 has a thickness equal to the filtration clearance between links 12 less the thickness of one screen link 12. The space between sprocket segments 16 is equal to the thickness of two screen links 12. These dimensions are critical for an effective cleaning function.

FIG. 3 also shows the position of the blade in the doctor blade assembly 70 against sprocket segments 16. This blade is made of an ultra high molecular weight (U.H.M.W) plastic.

Reference is now made to FIG. 4, which illustrates the driving and unloading mechanism and the screen mechanism of apparatus 10 according to the invention. The screen assembly 17 comprises links 12 mounted on pivot rods 23. Links 12 are separated by nylon acetal spacers 44 to provide for the filtration clearance between links. Closure links 38 are attached to pivot rods 23 for sealing the outsides edges of the screen assembly 17. Nylon acetal guide rollers 14 are mounted at both ends of pivot rods 23 so that screen assembly 17 rolls on the track assembly 13. Elastic stop nuts at both ends are used for locking the screen assembly 17 together. The entire screen mechanism of apparatus 10 is partially enclosed by two side support frames 46 held together by flanged spreaders 11.

The driving and unloading mechanism comprises a stationary support bar 50 bolted to support frames 46 through a drive mounting bracket 52. A stainless steel driven chain sprocket 58 having longitudinally disposed, diametrically opposed dual key ways 56 are included to drive sprocket segments 16. Dual key ways 56 are illustrated in FIG. 3. Referring again to FIG. 4, the sprocket segments 16, made of plastic or metal, are separated by sprocket spacers 61 to position segments 16 at a uniform spacing consistent with the spacing of the screen links 12. Thrust washers and locking nuts at both ends are used to lock the segment assembly together. The driven chain sprocket 58 rotates the segment assembly. A drive chain 15 engages both the sprocket 58 and a steel drive sprocket 42 attached to the double reduction gear drive 20. Drive 20 is mounted to a mounting bracket 60. The variable speed motor 18 provides the rotational driving force to the gear drive 20, which in turn moves the segment assembly. The segment assembly in turn moves the screen assembly 17. The position of the doctor blade assembly 70 and the counterweight 71 attached therein is illustrated also in FIG. 4.

In this embodiment, the links 12 are 0.060 filter links. The sprocket segments 16 are made of plastic. The motor 18 is a Reliance Duty Master motor P56H-1343N NK, ⅓ H.P. TENV 1140 RPM FA56C FRAME, 3 PH. 60 HZ 230/460 v. The gear drive 20 is a Reliance, Tigear-Right Angle Reducer 56/CM12A, 240:1 Ratio, K Mounting. The rollers 14 are made of 2" nylon acetal. The screen links 12 are connected together by pivot rods 23. These rods are made of ⅜" diameter 400 Series stainless steel.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, that which is claimed is:

1. An apparatus that removes from a stream of water items of waste materials having dimensions greater than a preselected minimum size, comprising:
 a screen assembly;
 said screen assembly formed by a plurality of link members;
 said link members connected in end to end relation to one another to form a continuous loop means;
 a plurality of said loop means disposed in laterally spaced relation to one another to form said screen assembly;
 each of said loop means positioned in lateral registration with at least one contiguous loop means so that said screen assembly includes a plurality of rows of laterally spaced and laterally aligned link members that define laterally disposed spaces therebetween through which spaces water and small debris may flow freely;
 the lower end of said screen assembly being immersed in said stream of water and the upper end of said screen assembly being disposed out of said stream;
 a motor for rotating said screen assembly;
 said link members having a generally "L"-shaped configuration and being operable to engage said items and lift them out of said stream of water attendant rotation of said screen assembly by said motor;
 a plurality of sprocket segments positioned interiorly of said loop means formed by said screen assembly and said sprocket segments disposed in laterally spaced relation to one another and having a fixed, common axis of rotation normal to the direction of flow of said stream of water;
 said plurality of sprocket segments being equal in number to the number of spaces defined by a single row of said laterally spaced link members;
 said sprocket segments fixed intermediate said link members, in the spaces defined therebetween, at the upper, nonimmersed end of said screen assembly and said sprocket segments being rotated by said motor;
 and said segments specifically configured and dimensioned to provide full protrusion of said segments through the spaces between said link members which protrusion separates said items from said link members attendant rotation of said screen assembly.

2. A filtering apparatus as recited in claim 1, further comprising:
 said lower end of said screen assembly being spaced upwardly from the floor of a channel within which flows said stream of water so that said channel floor does not interfere with the free rotation of said screen assembly;
 passage blocking means for blocking passage of items of waste materials through said space between said channel floor and the lower end of said screen assembly;
 said passage blocking means positioned relative to said channel floor to provide substantially the same filtration clearance as said link members;
 said passage blocking means provided in the form of an arcuate plate having a radius substantially equal to an outside turning radius of the screen assembly plus a filtration clearance between said link members.

3. A filtering apparatus as recited in claim 2, wherein said passage blocking means comprises an arch-shaped plate member having a radius of curvature substantially equal to the outside turning radius of said screen assembly plus the filtration clearance of said link members.

4. A filtering apparatus as recited in claim 1, further comprising:
 protecting means for protecting said filtering apparatus from items of waste materials that may protrude into said screen assembly;
 said protecting means attached to the upper end of said apparatus and mounted in a fixed position so that said screen assembly moves with respect thereto;
 said protecting means provided in the form of an arcuate plate having a radius substantially equal to an inside turning radius of said screen assembly.

5. A filtering apparatus as recited in claim 3, wherein said protecting means comprises an arch-shaped plate member having a radius of curvature equal to the inside turning radius of said screen assembly.

6. A filtering apparatus as recited in claim 1, wherein said link members are provided with a tooth-shaped extension having a relieved back surface.

7. A filtering apparatus as recited in claim 1, wherein each of said sprocket segments comprises a substantially square in configuration plate member having its four corners removed in a preselected pattern to prevent interference of said segments with an unloading action of said screen assembly and to allow the protruding of said segments through the respective spaces between said link members to clean said screen assembly.

8. A filtering apparatus as recited in claim 1, wherein said link members follow a path of travel attendant rotation of said screen assembly that includes a generally upwardly directed portion that is inclined away from the direction of flow of said stream of water, a generally horizontal but slightly downwardly inclined portion in the direction of flow of said stream, an upper return bend portion, a generally horizontal but slightly upwardly inclined portion in the opposite direction of flow of said stream, a generally downwardly directed portion that is inclined toward the direction of flow of said stream, and a lower return bend portion that completes the path of travel.

9. A filtering apparatus as recited in claim 8, further comprising:
 a blade means for wiping off items of waste material that cling to said link members;
 biasing means for maintaining said blade means in continuous wiping contact with said link members;
 and said blade means positioned at the upper return bend portion of said path of travel.

10. A filtering apparatus as recited in claim 9, wherein said biasing means is provided in the form of a counterweight member.

11. A filtering apparatus as recited in claim 1, wherein said link members are of generally "L"-shaped configuration.

12. A filtering apparatus as recited in claim 11, wherein the respective interior angles of said "L"-shaped link members is rounded so that items of waste materials cannot become lodged therein.

13. A filtering apparatus as recited in claim 12, wherein the respective truncate portions of said "L"-shaped link members are disposed so that they project into said stream of water, and wherein the respective elongate portions of said link members extend upwardly relative to said truncate portions at the portion of a path of travel of said screen assembly where said link members are rising upwardly out of said stream attendant rotation of said screen assembly so that said truncate portions of said link members provide a lifting function that lifts items of waste materials from said stream of water.

14. An apparatus that removes relatively large items of waste materials from an unfiltered flow of water in a channel, comprising:
 a plurality of generally "L"-shaped link members disposed in end to end articulated relation to one another which link members collectively form a continuous loop means;
 a plurality of said loop means disposed in laterally spaced relation and in lateral registration to one another to collectively form a screen assembly;
 said screen assembly defined by a plurality of rows of said link members;
 a plurality of rotatably mounted, fixed position, laterally spaced sprocket segment members;
 there being as many of said sprocket segments as there are spaces between the link members of a single row of said screen assembly;
 a motor for rotating said screen assembly and said sprocket segments;
 said screen assembly following a path of travel that includes an upper return bend portion;
 said sprocket segment members fixed interiorly of said screen assembly at said upper nonimmersed return bend portion and each sprocket segment member being specifically disposed to substantially occupy all of the space between contiguous link members as each row of said link members sequentially rotate therepast;
 said sprocket segment members operative to push items of waste material clinging to said link members away from said link members so that said items separate from said link members.

* * * * *